United States Patent
Zhernov et al.

(10) Patent No.: US 11,675,855 B2
(45) Date of Patent: Jun. 13, 2023

(54) VARIABLE THRESHOLDS IN CONSTRAINED OPTIMIZATION

(71) Applicant: DeepMind Technologies Limited, London (GB)

(72) Inventors: Anton Zhernov, London (GB); Krishnamurthy Dvijotham, London (GB); Xiaohong Gong, Sunnyvale, CA (US); Amogh S. Asgekar, Palo Alto, CA (US)

(73) Assignee: DeepMind Technologies Limited, London (GB)

( * ) Notice: Subject to any disclaimer, the term of this patent is extended or adjusted under 35 U.S.C. 154(b) by 135 days.

(21) Appl. No.: 16/951,920

(22) Filed: Nov. 18, 2020

(65) Prior Publication Data
US 2021/0149968 A1   May 20, 2021

Related U.S. Application Data

(60) Provisional application No. 62/937,226, filed on Nov. 18, 2019.

(51) Int. Cl.
*G06F 17/00* (2019.01)
*G06F 16/93* (2019.01)
(Continued)

(52) U.S. Cl.
CPC .............. *G06F 16/93* (2019.01); *G06N 5/04* (2013.01); *G06N 20/00* (2019.01)

(58) Field of Classification Search
CPC .. G06F 16/93; G06F 16/3349; G06F 16/2453; G06F 16/245; G06F 16/47;
(Continued)

(56) References Cited

U.S. PATENT DOCUMENTS

| 7,743,009 B2 | 6/2010 | Hangartner et al. |
| 8,082,549 B2 | 12/2011 | Corley et al. |

(Continued)

OTHER PUBLICATIONS

Changsung Kang et al., Learning to re-rank web search results with multiple pairwise features. In Proceedings of the fourth ACM international conference on Web search and data mining. Association for Computing Machinery, 735-744. <https://doi.org/10.1145/1935826.1935924>, (Year: Feb. 2011).*

(Continued)

*Primary Examiner* — Greta L Robinson
(74) *Attorney, Agent, or Firm* — Fish & Richardson P.C.

(57) ABSTRACT

Methods, systems, and apparatus, including computer programs encoded on computer storage media, for re-ranking a collection of documents according to a first metric and subject to a constraint on a function of one or more second metrics. One of the methods includes: obtaining, for each document in the first collection of documents, a respective first metric value corresponding to the first metric and respective one or more second metric values corresponding to the one or more second metrics; re-ranking the first collection of documents, comprising: determining the constraint on the function of one or more second metrics by computing a first threshold value using a variable threshold function that takes as input second metric values for the documents in the first collection of documents; and determining the re-ranking for the first collection of documents by solving a constrained optimization for the first metric constrained by the first threshold value.

21 Claims, 4 Drawing Sheets

(51) Int. Cl.
*G06N 5/04* (2023.01)
*G06N 20/00* (2019.01)

(58) Field of Classification Search
CPC ........ G06F 16/24565; G06F 16/24578; G06N 5/04; G06N 5/003; G06N 20/00; G06N 5/01
See application file for complete search history.

(56) References Cited

U.S. PATENT DOCUMENTS

| | | | |
|---|---|---|---|
| 10,102,292 B2 * | 10/2018 | Vorobev | G06F 16/24578 |
| 10,120,879 B2 | 11/2018 | An et al. | |
| 10,474,827 B2 | 11/2019 | Zhu et al. | |
| 2009/0132515 A1 * | 5/2009 | Lu | G06N 5/003 |
| | | | 707/999.005 |
| 2011/0196859 A1 * | 8/2011 | Mei | G06F 16/248 |
| | | | 707/723 |
| 2014/0059055 A1 * | 2/2014 | Nag | G06F 16/9535 |
| | | | 707/748 |
| 2017/0132730 A1 * | 5/2017 | Takuma | G06F 16/26 |
| 2017/0337695 A1 | 11/2017 | Sarkar et al. | |
| 2021/0004420 A1 * | 1/2021 | Mittal | G06F 16/9535 |
| 2021/0014566 A1 | 1/2021 | Loheide et al. | |

OTHER PUBLICATIONS

Peng Li et al., Document Re-ranking Using Partial Social Tagging. In Proceedings of the The 2012 IEEE/WIC/ACM International Joint Conferences on Web Intelligence and Intelligent Agent Technology, vol. 1, IEEE Computer Society, 274-281,(Year: Dec. 2012).*
Mei et al., "Multimedia Search Reranking: A Literature Survey," ACM Computing Surveys, Jan. 2014, 46(3):1-38.
Shah et al., "Online Ranking with Constraints: A Primal-Dual Algorithm and Applications to Web Traffic Shaping," Proceedings of the 23rd ACM SIGKDD International Conference on Knowledge Discovery and Data Mining, Feb. 2017, 23 pages.

* cited by examiner

*400*

```
┌─────────────────────────────────────────────────────────────┐
│ Receive a request to re-rank a first collection of documents │
│ subject to a constraint                                      │
│                                                        402   │
└─────────────────────────────────────────────────────────────┘
                              │
                              ▼
┌─────────────────────────────────────────────────────────────┐
│ Obtain, for each document in the first collection of        │
│ documents, a respective first metric value and respective   │
│ one or more second metric values                            │
│                                                        404  │
└─────────────────────────────────────────────────────────────┘
                              │
                              ▼
┌─────────────────────────────────────────────────────────────┐
│ Determine the constraint on the function of one or more     │
│ second metrics                                              │
│                                                        406  │
└─────────────────────────────────────────────────────────────┘
                              │
                              ▼
┌─────────────────────────────────────────────────────────────┐
│ Determine the re-ranking for the first collection of        │
│ documents by solving a constrained optimization             │
│                                                        408  │
└─────────────────────────────────────────────────────────────┘
```

FIG. 4

VARIABLE THRESHOLDS IN CONSTRAINED OPTIMIZATION

CROSS-REFERENCE TO RELATED APPLICATION

This application claims priority to U.S. Provisional Application No. 62/937,226, filed on Nov. 18, 2019. The disclosure of the prior application is considered part of and is incorporated by reference in the disclosure of this application.

BACKGROUND

This specification relates to ranking documents using machine learning models, including neural networks.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations for re-ranking collections of documents according to ranking scores generated by performing a constrained optimization for a first metric subject to a variable threshold value constraining one or more second metrics.

A re-ranking system receives a collection of initially ranked documents, as input, and generates, as output, a respective ranking score for each ranked document. The respective ranking scores are used, e.g., by the re-ranking system or other system communicatively coupled to the re-ranking system, to re-rank the collection of documents before the collection of documents are provided for presentation on a user device.

The subject matter described in this specification can be implemented in particular embodiments so as to realize one or more of the following advantages.

Generating ranking scores in response to a request to re-rank a collection of documents can be done more efficiently by solving a constrained optimization problem using a variable threshold value. Instead of solving a global optimization for each request, a re-ranking system can more efficiently determine weight values for generating ranking scores, by using a pre-generated variable threshold function fitted to a distribution of data.

Depending on the present measure of quality for the collection of documents in a request, collections can be re-ranked so that higher quality collections are re-ranked with fewer swaps than lower quality collections. Therefore, the re-ranking system can spend less time trying to optimize ranking scores for collections of documents that are already of a high quality, and spend more time improving the ranking of lower quality collections.

Specifically, if the total computational resources are given (e.g., a computer system with pre-assigned memory, storage, and computing units) when requested to re-rank the initially ranked collections of documents, a system implemented by one or more computers in one or more locations that adopts the described techniques can allocate more computational resources to re-rank collections that are originally low in ranking quality using respective higher re-ranking threshold values, and spend less computation time and resources for re-ranking the higher quality collections. That is, the described techniques can improve computation efficiency when the computational resources are limited during re-ranking collections.

The variable threshold function can be determined offline and used as part of serving each request received online. The respective weight values for the ranking scores for a received collection can be obtained more efficiently, e.g., using binary search, over solving a global optimization for each request. Serving the requests online is invariant to the distribution shift of ranking scores, because weights for the ranking scores are generated based on actual metric values for the documents in the collection. Also, the threshold is relative to the collection of documents, and is therefore more relevant for improving a ranking, as opposed to a fixed threshold value that is applied globally but may not be appropriate for the specific metric values of a collection that are being constrained.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an example process of optimizing ranking scores using the re-ranking system.

Like reference numbers and designations in the various drawings indicate like elements.

DETAILED DESCRIPTION

Figure 1:
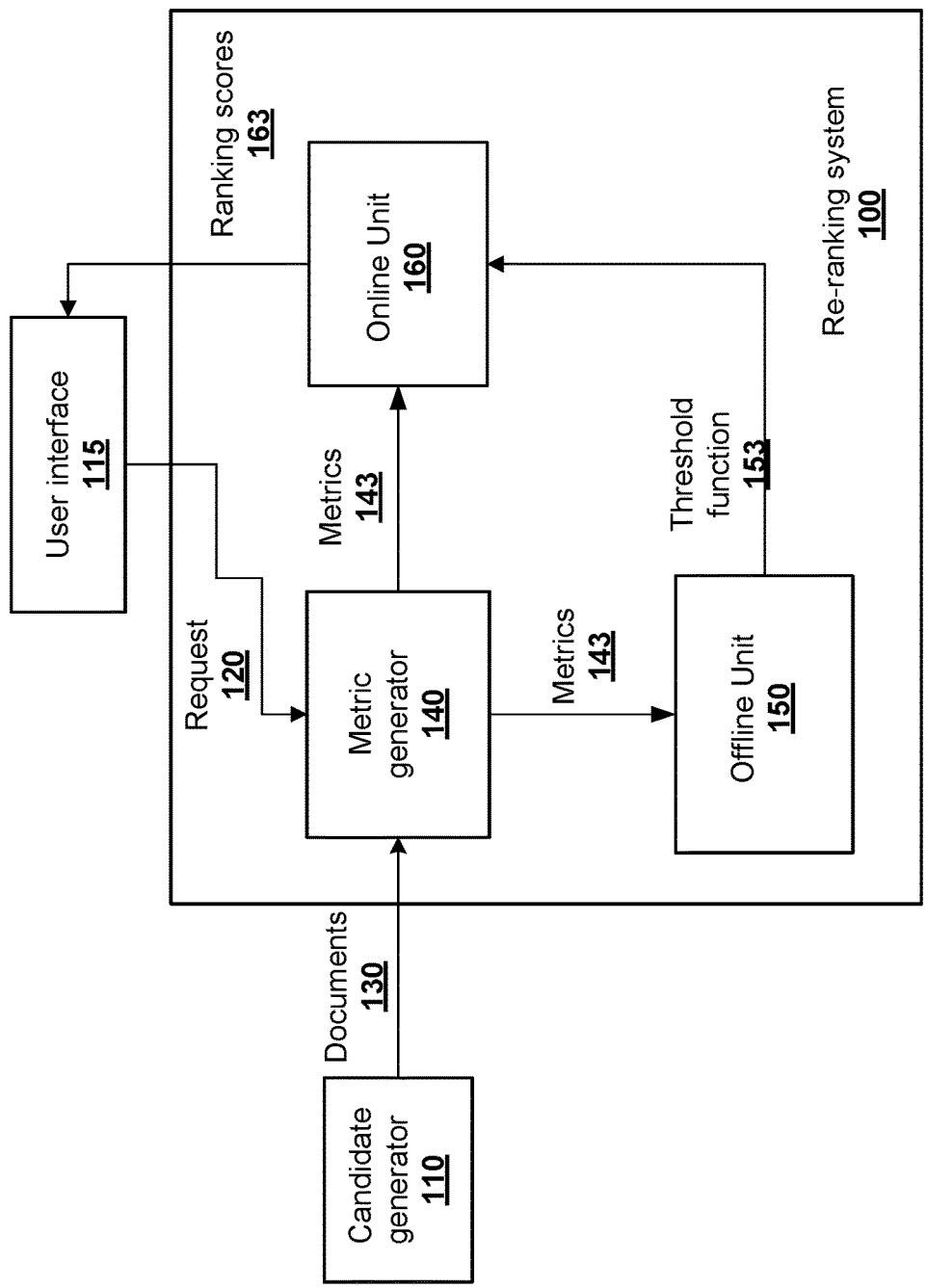
FIG. 1 shows an example re-ranking system.

One technical problem for re-ranking a collection of documents to be presented in a user interface according to a re-ranked order is how to improve the efficiency and accuracy of a re-ranking system when re-ranking.

To address this problem, a re-ranking system adopting the described techniques can first generate one or more candidate collections of documents with an initial order. In some implementations, the initial order can be obtained randomly, determined by applying one or more heuristics, or generated through a learned neural network. Then the ranking system can optimize the initial order for the one or more candidate collections of documents by solving respective global optimization problems concerning one or more metrics. The metrics can be, e.g., the quality of each document in the collection, time that users spend on the document when browsing the collection, purchase/installation rate for the document, and time that users spend on the document after purchasing/installing the document.

A re-ranking system adopting conventional methods is configured to solve a global optimization problem for maximizing an expectation value for a metric (e.g., a measured value representing user engagement) subject to constraints such that an expectation of a quality measure for the collection should not be less than a certain threshold value after re-ranking. The certain value used in conventional methods is a constant scalar that is the same for all collections under all re-ranking requests. In some implementations, the re-ranking system using conventional methods solves the global optimization problem offline, i.e., the system can locally store data representing metrics, collections of documents, and fixed value constraints, and re-rank the collection of documents locally once requested.

Systems that employ these conventional methods using constant value constraints can have several issues: e.g., expensive computation cost when optimizing a re-ranked order for a collection of documents, inaccurate re-rank order for the collection, and even failures in obtaining a converged re-ranked order for the collection. Specifically, a constant value constraint used for optimizing a re-ranking process requires more swaps of high-ranking-quality collections during re-ranking than that of low-ranking-quality ones. However, as the high-quality documents of a high-ranking-quality collection are already ranked in top positions, it requires more computational cost and time for re-ranking the collection to increase an expectation value of a quality measure satisfying the constant value constraint. It is not uncommon to see that, in some cases, a system adopting the conventional methods cannot find a solution under such a constant value constraint, which degrades re-ranking performance and efficiency of the system. Besides, solving the optimization problem offline can be less accurate than solving it online, because the expected measured quality for an input collection after re-ranking depends on distributions of one or more metrics. The distributions used for a re-ranking process can be outdated when users' priorities and interests change for each search.

The described techniques below are intended to address the above-noted issues.

FIG. 1 shows an example re-ranking system 100.

The re-ranking system 100 is an example of a system implemented as computer programs on one or more computers in one or more locations, in which the systems, components, and techniques described below can be implemented.

Generally, upon a request 120 for re-ranking from a user interface 115 (or sometimes directly from a user, such as voice control), the re-ranking system 100 takes as input a collection of documents 130 in an initial order, and output ranking scores 163 for re-ranking the input collection of documents 130 after solving a global optimization problem concerning one or more metrics subject to a constraint on a function of some or all of the metrics.

The constraint is a threshold value, which documents must satisfy when re-ranked according to the ranking scores generated by the re-ranking system 100. For example, the threshold value can be a minimum or maximum value that the function must meet or not exceed, respectively, when the system 100 re-ranks the documents.

In some implementations, the re-ranking system 100 can be part of a larger recommender system. The collection of documents 130 can be generated by a candidate generator 110, which can include a candidate generation machine learning model. The candidate generation machine learning model can be any type of machine learning model, e.g., a neural network, trained to output recommended documents from the plurality of documents based on metric values for the documents. The recommended documents, i.e., a collection of documents 130, are received as input by the re-ranking system 100 to be re-ranked. The collection of documents can be, e.g., 200 documents, selected from, for example, thousands of documents.

A document refers generally to any digital representation of something that is ranked. For example, a document can represent a software application available at an online software application store.

The system 100 provides the input documents 130 to a metric generator 140, which is configured to generate one or more metrics 143 used for the system 100 to define a global optimization problem for re-ranking. Each document 130 is associated with metric values representing different metrics of the documents. The metrics define different measurements, depending on what the documents represent. For software applications, metrics can be user engagement, install rate, number of times clicked/viewed, number of times accessed by a user after installation, or application performance quality.

In the following description, the metrics 143 generated by the metric generator 140 include at least a first and a second metric. The first metric relates to user engagement, i.e., an expected measure for how much time the user spent on a document, and how many times the user purchased/installed the document, or both. The second metric relates to document quality subject to a ranking, i.e., an expected measure of quality of the collection of document 130 after ranking.

For example, if the collection of documents are a plurality of software applications presented in an online software application store, the first metric can be a probability of usage of one of the plurality of software applications by users within a predetermined period of time, and the second metric can be used to generate a measure of the software application quality in the collection. The measure of the quality of a collection of software applications can be determined based on, e.g., contents of each software application weighted by the corresponding ranked position among the ranked collection. For example, placing a software application initially positioned at a low position with good content to a higher position can increase the measured quality of the collection.

The re-ranking system 100 provides the metrics 143 to the offline unit 150 for generating a threshold function 153 based on the metrics 143. Specifically, the generated threshold function 153 is a functional form that receives as input one or more metrics 143 and provides as output a required quality improvement for the collection after re-ranking, which is used as variable constraint for optimizing a metric measure during re-ranking. The re-ranking system 100 provides the threshold function 153 to an online unit 160 that is configured to solve the optimization problem subject to the variable threshold values generated from the threshold function 153 and metrics 143 to obtain ranking scores 163.

In some implementations, the re-ranking system 100 can provide the ranking scores 163 for presentation in the user interface 115 in an order according to the ranking scores 163.

Thus, the online unit 160 of the re-ranking system 100 can provide a high-quality ranking of a collection of documents per re-ranking request, which is allowed by applying a respective variable threshold value for each ranking request. The high-quality ranking represented by the ranking scores 163 substantially prioritizes metrics that are of users' interests and satisfies the users' informational needs. The online unit 160 that adopts the respective variable threshold values also improves the computational efficiency for the re-ranking process, as described above.

Figure 2:
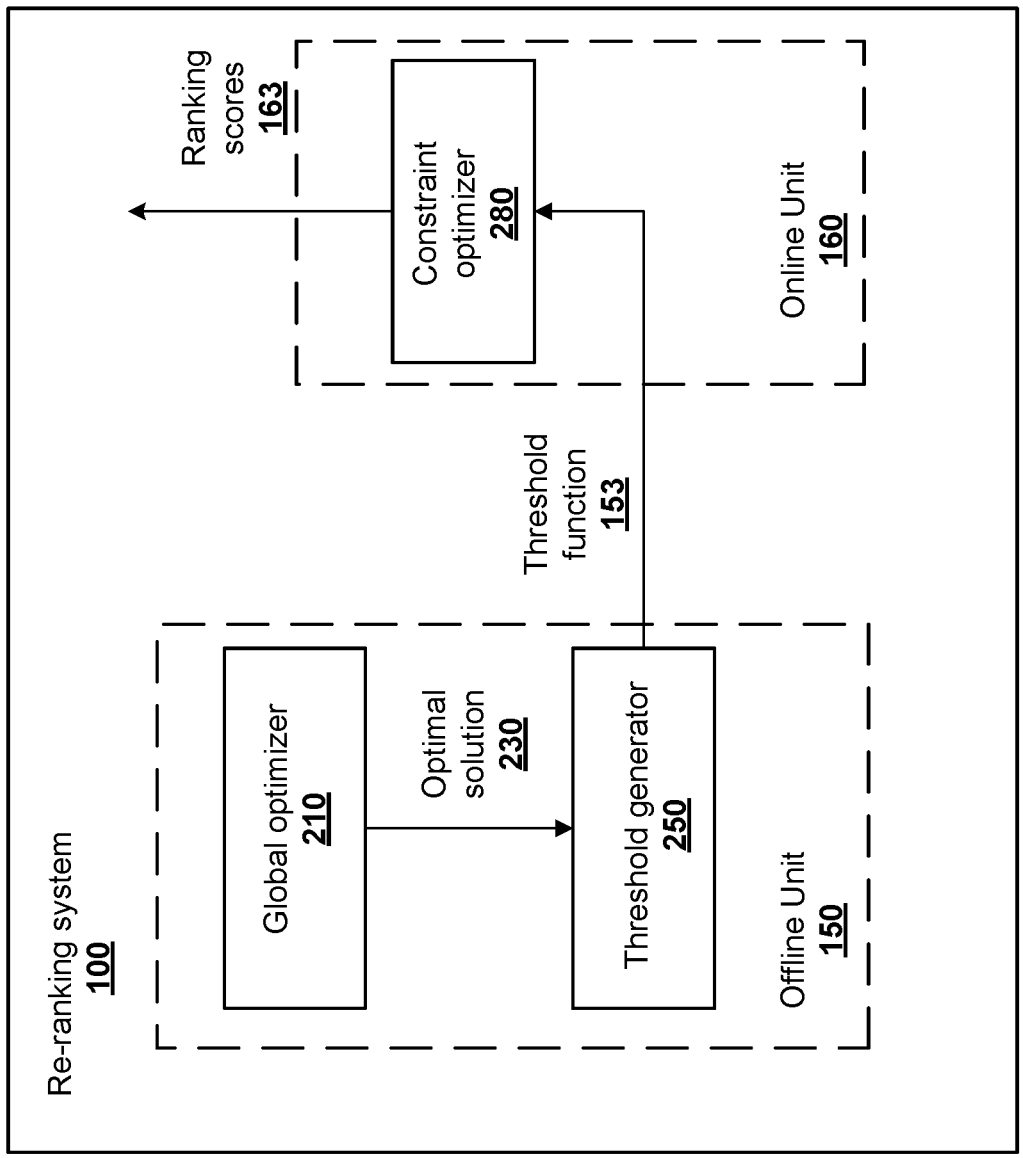
FIG. 2 illustrates an example of offline unit and an example of online unit of the re-ranking system.

FIG. 2 illustrates an example of offline unit 150 and an example of online unit 160 of the re-ranking system 100.

As shown in FIG. 2, the offline unit 150 includes a global optimizer 210 and a threshold generator 250. The offline unit 150 is implemented by one or more computers located in one or more locations. The offline unit 150 carries out calculations and processes offline, i.e., independently of when requests for re-ranking are received.

The system 100 provides metrics 143 including the first metric and the one or more second metrics to the offline unit 150. More specifically, the system 100 provides to the global optimizer 210 the first metric values representing the first metric, e.g., user engagement, and one or more second metrics values representing the one or more second metrics, e.g., ranking quality, for each document of the first collection of documents 130.

In the below description, the first metric will be assumed to be user engagement and the one or more second metrics will be assumed to measure ranking quality. More generally, however, the first and second metrics can be any appropriate measure that characterizes the collection of documents. Generally, data identifying the first and second metrics is provided as input to the system 100 before the operation of the system 100 to re-rank the collection of documents.

The expected measure of any given metric for re-ranking a collection of documents are calculated from metric values of each document for the given metric, a respective user attention probability for each position in the ranking order (i.e., a scalar associated with a position of a ranked order, independent of the user, re-ranking request, and documents' content), and a matrix that represents the probability of assigning each document to each position of a ranked order. An example expression for the expected measure of a given metric is expressed as below:

$$E(m_t, k) = \sum_{i=1}^{M_k} \sum_{j=1}^{M_k} P_{ij}^k A_j m_t(D_i^k).$$

For each request k to re-rank a collection of $M_k$ documents, $m_t$ outputs the metric value for each document $D_i^k$ with respect to $t^{th}$ metric. $A_j$ represents the user attention probability, and P represents the probability of assignment. Because of the user attention probability $A_j$, re-ranking the collection of the same documents under the same re-ranking request k, can result in a change of the expected measure of a metric for the collection. For example, the ranking quality of the collection can improve by a percentage after re-ranking. The change of the expected measure of the first metric (e.g., user engagement) after re-ranking, is similar.

The global optimizer 210 solves a global optimization problem aiming at maximizing the overall expected value for the user engagement, subject to a constraint that the overall improvement in ranking quality as a result of the re-ranking should not be less than a certain value. The user engagement can be denoted as variable uRUC, and the ranking quality can be denoted as variable pQuality. For every $k^{th}$ ranking request of N ranking requests to rank a collection of documents, the global optimization problem that the global optimizer 210 is configured to solve can be expressed as Equation 1 below:

$$\text{Maximize}\left(\sum_{k=1}^{N} E(uRUC, k)\right) \text{ subject to:} \quad \text{(Equation 1)}$$

$$\Delta \sum_{k=1}^{N} E(pQuality, k) \geq X.$$

It is shown from Equation 1 that the global optimization for the first metric (e.g., user engagement) is constrained by a constant threshold value (e.g., X of Equation 1) for the function of one or more second metrics (e.g., the improvement of expectation function of ranking quality). The fixed threshold value X is a pre-determined value or a percentage of the pre-determined value. Specifically, the fixed threshold value X is a relative value, e.g., a percentage, representing the relative improvement in the expected ranking quality after re-ranking.

The user engagement uRUC depends on users' interests and search objectives, which is associated with each re-ranking request k. That is, the distributions of user engagement for the same document of a collection can be different between different requests k. For example, in the first request, the user might be interested in housing search software applications, thus the user will engage more in applications that offer respective house renting/sale lists, and might be more likely to click on housing search applications that are even initially positioned low in order. However, in a second request, the user might have found a new flat and is now interested in searching for home décor software applications. Now the user engagement for the same housing search application is differently distributed, thus expectation measures of the user engagement are different accordingly.

Additionally, the expected measure of one or more metrics are calculated using the above-mentioned square matrix P that represents probabilities of assignment, for each re-ranking request k, each document to each position of a ranking. The matrix P depends on each re-ranking request k, thus the expected measure of the one or more metrics is a function of each request k.

The function of one or more second metrics is generally any function that receives, as input, second metric values from documents in a collection to be re-ranked. For example, the function can generate, as output, an expected measure of the quality of the documents after re-ranking according to scores generated by the re-ranking system.

By solving the global optimization problem, the global optimizer 210 obtains optimal solution 230 representing a sorting process according to updated ranking scores. To generate the updated ranking scores, the optimizer 210 is configured to find a respective updated weight for each document in the collection by solving the dual problem as shown in Equation 2:

$$\text{Min}\left(\text{Maximize}\left(\sum_{k=1}^{N} E(uRUC, k)\right) + \lambda\left(\sum_{k=1}^{N} E(pQuality, k) - Y\right)\right). \quad \text{(Equation 2)}$$

The $\lambda$ in Equation 2 represents the respective updated weight, and the constant scalar Y represents the absolute ranking quality improvement in contrast to X, which represents a relative ranking quality improvement, as explained above.

The optimizer 210 generates the updated ranking scores through an optimal solution functional form that takes as input first metric values and weighted second metric values, i.e., updated ranking scores=uRUC+$\lambda$*pQuality. Each weighted second metric value is a result of the multiplication of a respective ranking quality and a respective updated weight, i.e., $\lambda$*pQuality. The respective updated weights A can be obtained in any conventional manner, for example, gradient descent method. More detail for solving the global optimization problem can be found in Shah, et al, Online Ranking with Constraints: A Primal-Dual Algorithm and Applications to Web Traffic Shaping (2017).

In some implementations, the re-ranking system 100 can directly output the updated ranking scores and utilize them for guiding the re-ranking process. Even though the updated ranking scores are globally optimal, the system 100 still needs to recalculate the weights if the distribution of either user engagement or ranking quality changes. This is because the optimization problem is based on absolute ranking quality improvement γ.

The re-ranking system 100 can provide the optimal solution 230 to the threshold generator 250 to generate a variable threshold function 153. The variable threshold function 153 receives as input one or more second metric values, or functions for the one or more second metric values, for the documents in the collection of documents and generates as output a threshold value for the corresponding request.

The generator 250 can generate the variable threshold function 153 by fitting a function to a data distribution that is generated from the optimal solution 230. As a particular example, the variable threshold function 153 maps an expected ranking quality of a collection of documents to a threshold, i.e., to the corresponding expected improvement of ranking quality for the collection after re-ranking the documents of the collection.

In some implementations, the respective measures of quality of the collections of documents are respective expected measures of quality computed using respective first metric values for the collections of documents. The respective comparisons between the collections of documents before and after re-ranking are respective percentage differences for the expected measures of quality for the collections of documents before and after re-ranking.

The variable threshold function 153 is substantially monotonically decreasing for the increase of the input expected ranking quality of a given collection. In other words, a smaller threshold value (e.g., a smaller requirement in relative improvement) is generated for a collection that has a higher expected ranking quality, which results in fewer swaps for documents of the high-ranking-quality collection during re-ranking.

The function 153 can have a form as a linear function or an exponential function. For example, the variable threshold function 153 can have a linear functional form as expressed by Equation 3.

$$V(E(pQuality,k,\text{when sorting by }uRUC))=a*E(pQuality,k,\text{when sorting by }uRUC)+b \quad \text{(Equation 3)}$$

The coefficients a and b in Equation 3 are scalar values characterizing the linear functional form for the variable threshold function V. In some implementations, the expected measure of the ranking quality of the collection under request k can be obtained through sorting each document of the collection according to the user engagement. In some implementations, these coefficients are fitted through data distribution generated by optimal solution 230. The implementations of fitting the variable threshold function are described in more detail below.

It is shown from Equation 3 that the variable threshold value v generated from the variable threshold function V takes as input a function of one or more second metric values. In some implementations, the system 100 obtains the variable threshold value v by processing an expected value of the one or more second metric values for the collection of documents, through the variable threshold function. More specifically, each variable threshold value v obtained by the threshold function V taking as input a respective expected ranking quality of the collection of documents during each re-ranking process.

The re-ranking system 100 then provides the variable threshold function 153 to the online unit 160. The online unit 160 performs operations "online," i.e., in response to received re-ranking requests, so that the online unit 160 operates on online metric distributions that are substantially up-to-date.

A constraint optimizer 280 of the online unit 160 receives as input the threshold function 153 and generates ranking scores 163 by solving a global optimization problem subject to constraints using a variable threshold value for the collection of documents, which can be expressed by Equation 4 as:

$$\text{Maximize}\left(\sum_{k=1}^{N} E(uRUC, k)\right) \text{ subject to:} \quad \text{(Equation 4)}$$

$$\Delta \sum_{k=1}^{N} E(pQuality, k) \geq$$

$$V(E(pQuality, k, \text{when sorting by } uRUC)).$$

On the right-hand side of Equation 4, the scalar variable value v stands for the variable threshold value for each collection of documents. The re-ranking system 100 dynamically determines the threshold value v for each input collection of documents 130 as part of responding to a re-ranking request k.

The threshold value v generated from the threshold function V is the value of constraint that the collection of documents, when re-ranked, must satisfy to meet. The threshold value v can vary from request to request because each collection of documents to be re-ranked for different requests can have different second metric values, which causes the variable threshold function to generate different threshold values. For example, the respective threshold value v for a first re-ranking request is referred to as the first threshold value, and the respective threshold value v for a second re-ranking request is referred to as the second threshold.

Similar to the global optimization problem described in Equation 1, the constraint optimizer 280 can solve the optimization problem by determining the respective weight values λ for re-ranking using binary search. The search target is an average weight value between two adjacent possible weight values, where one weight value causes the function of one or more second metrics of the re-ranked collection of documents to meet the variable threshold value, and the other weight value causes the function of one or more second metrics of the re-ranked collection of documents to not meet the variable threshold value. The possible weight values λ can range from 0 to the maximum feasible λ. The average weight value is also referred to as the optimal weight value, different from the updated weight value as described above. For example, a first weight value $\lambda_1$ can improve the expected ranking quality above a given variable threshold value, while a second weight $\lambda_2$ can result in an improvement of ranking quality below the given variable threshold value. The optimal weight λ is the averaged value of both λ1 and $\lambda_2$.

The constraint optimizer 280 obtains the optimal weights online, which are robust against variations in ranking score distributions: the optimal weights are not based on a weighted combination of two or more distributions of respective metric values offline (like the way that updated weights are calculated), but are always calculated based on the most accurate and up-to-date metric distributions online. Moreover, the one or more second metrics are measured through a relative threshold (instead of an absolute threshold) that is invariant to shifts in distributions.

In some implementations, the threshold value is a tuple of multiple threshold values, one for each of the one or more second metrics.

Figure 3:
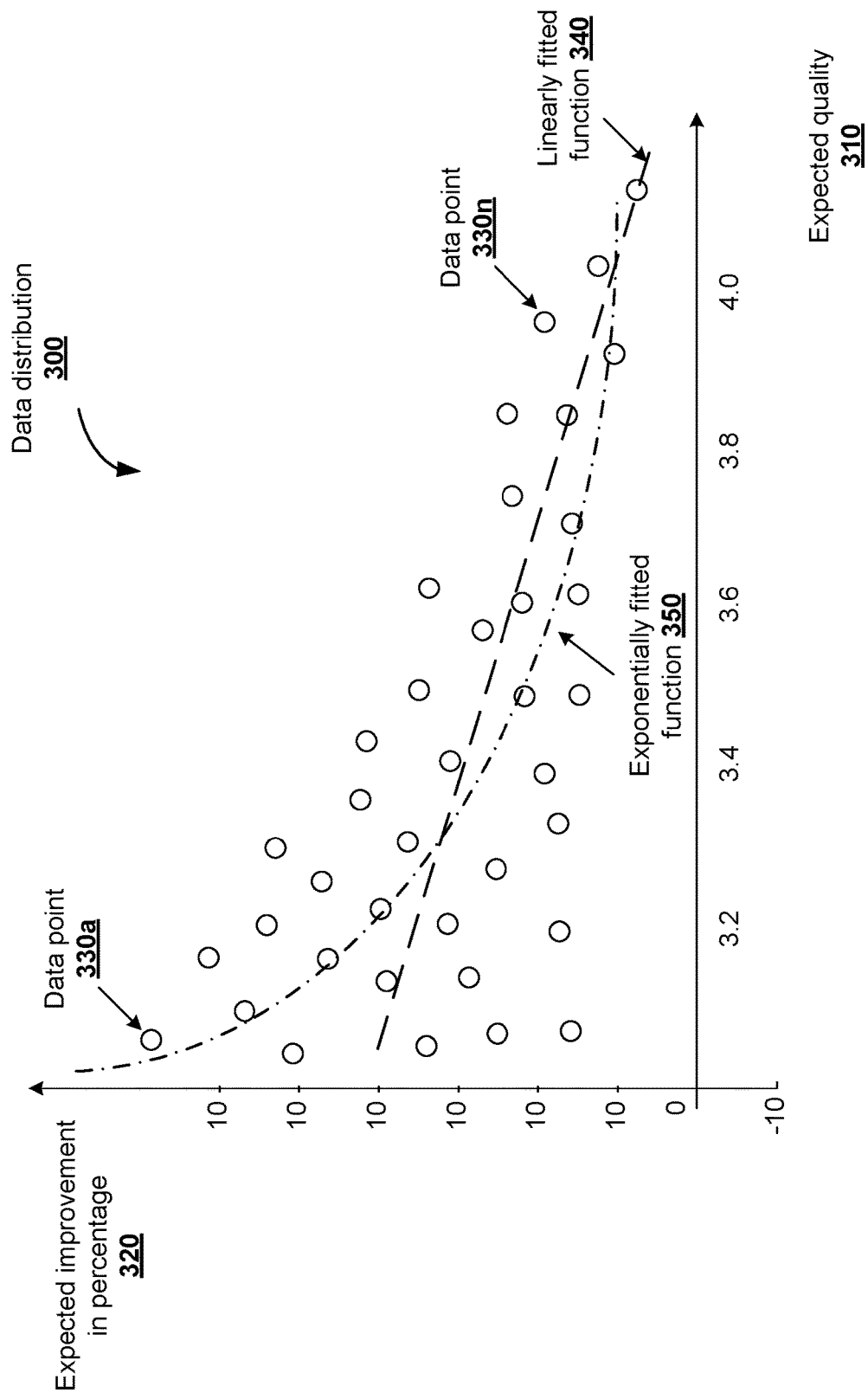
FIG. 3 illustrates an example of data distribution generated from the optimal solution using the re-ranking system.

FIG. 3 illustrates an example of data distribution 300 generated from the optimal solution using the re-ranking system 100.

As shown in FIG. 3, the re-ranking system 100 can generate a data distribution 300 of a plurality of data points 330, and each data point 330 is generated using the optimal solution 230 provided by the global optimizer 210. The data distribution 300 represents a mapping from the ranking quality of the re-ranked collection of documents to the improvement in ranking quality for the collection after re-ranking.

The plotted data distribution 300 includes a horizontal axis representing a respective expected ranking quality 310 for each collection, and a vertical axis representing a respective improvement in percentage 320 for the collection after re-ranking. It can be seen from FIG. 3 that collections of documents with lower expected quality value tend to have a higher improvement in percentage after re-ranking, while collections with higher expected quality value tend to have a lower improvement in percentage after re-ranking.

In other words, the data distribution 300 generally slopes downward as the ranking quality of a collection gets higher, reflecting the tendency that the difference in improvement for a re-ranking of a collection of documents gets smaller as the quality of the rankings goes up. The variable threshold function can be a monotonically decreasing function, for example, if fitted to this data distribution 300.

As a specific example, data point 330a representing a first collection has an expected ranking quality value below 3.2 associated with an expected improvement of over 60% after re-ranking, and data point 330n representing a second collection has an expected quality value above 3.8 associated with an expected improvement of around 20%. The expected improvement in percentage is thus not uniform over respected expected quality values for re-ranking each collection. To account for this, the re-ranking system 100 generates a variable threshold value as the constraint for each request to re-rank a respective collection of documents, rather than relying on a fixed threshold value or percentage of a fixed threshold value.

According to the data distribution 300, the re-ranking system 100 can generate a variable threshold function by fitting the data points 330. In general, the threshold function is a function of one or more second metrics that receives as input second metric values from documents in a collection to be re-ranked. The threshold function maps each input to output an expected measure of quality improvement of the collection of documents after re-ranking. The quality improvement can be an absolute improvement or a relative improvement. For example, the relative quality improvement is an expected improvement of quality in percentage after re-ranking.

In general, the variable threshold function can be fitted as any type of function to the data distribution, e.g., as a linear or exponential function. For example, the re-ranking system 100 fits the variable threshold function as a linear function 340 according to the data. As another example, the system 100 can also fit the variable threshold function as an exponential function 350 according to the data.

As described above, the re-ranking system 100 can compute the data distribution 300 and the variable threshold function 340 or 350 offline, and then later use the variable threshold function as part of serving requests to generate a threshold value for each collection of documents to re-rank the collection online.

FIG. 4 illustrates an example process 400 of optimizing ranking scores using the re-ranking system 100. For convenience, the process 400 will be described as being performed by a system of one or more computers located in one or more locations. For example, a re-ranking system, e.g., the system 100 of FIG. 1, appropriately programmed, can perform the process 400.

The system 100 receives a request to re-ranking a first collection of documents according to a first metric and subject to a constraint on a function of one or more second metrics. (402) The first metric can be user engagement, and the function of the one or more second metrics can be an expectation function of the ranking quality.

The system 100 obtains, for each document in the collection of documents, a respective first metric value corresponding to the first metric and respective one or more second metric values corresponding to the one or more second metrics. (404)

In response to the request to re-rank the first collection of documents, the system 100 determines the constraint on the function of one or more second metrics by computing a first threshold value using a variable threshold function that takes as input, second metric values for the documents in the collection of documents. (406) As explained above, the variable threshold value is computed using a variable threshold function that takes, as input, one or more second metric values, or a function of the one or more second metric values, obtained from documents of a collection. For each request to re-rank a collection of documents, the re-ranking system 100 can calculate a respective threshold value.

The system 100 then determines the re-ranking by solving a constrained optimization for the first metric constrained by the first threshold value for the function of one or more second metrics. (408) As part of determining the re-ranking for the collection of documents, in some implementations, the re-ranking system determines respective weight values for each of the second metrics that, when used in re-ranking the collection of documents, result in a re-ranking that optimizes the first metric constrained by the first threshold value for the one or more second metrics.

With the respective weight values, the system 100 determines a respective ranking score for each document of the collection of documents based on the respective weight values. The system 100 can then re-rank the documents according to the determined ranking scores, or alternatively send the ranking scores to another system that performs/displays the re-ranking.

The re-ranking system 100 can receive a second request to re-rank a second collection of documents according to the first metric and subject to a second constraint on the function of one or more second metrics. In response to the second request to re-rank the second collection of documents, the re-ranking system re-ranks the second collection of documents, which includes: determining the second constraint on the one or more second metrics by computing a second threshold value using the variable threshold function; and determining the re-ranking for the second collection of documents by solving a constrained optimization for the first metric constrained by the second threshold value for the function of one or more second metrics.

The second threshold value computed for the second request can be a different value than threshold values computed by the re-ranking system 100 for other requests.

After re-ranking the documents, the re-ranking system 100 or another system can send the re-ranked documents to a computing device with a user interface for display in order of the re-ranking. For example, if the documents represent software applications, the software applications are displayed in the user interface in order of ranking, e.g., left-to-right, or top-to-bottom.

Other implementations of the technologies described in this specification include corresponding computer systems, apparatus, and computer programs recorded on one or more computer storage devices, each configured to perform the actions of the methods.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a request to re-rank a first collection of documents according to a first metric and subject to a constraint on a function of one or more second metrics;
obtaining, for each document in the first collection of documents, a respective first metric value corresponding to the first metric and respective one or more second metric values corresponding to the one or more second metrics;
in response to the request to re-rank the first collection of documents, re-ranking the first collection of documents, comprising:
determining the constraint on the function of one or more second metrics by computing a first threshold value using a variable threshold function that takes as input second metric values for the documents in the first collection of documents; and
determining the re-ranking for the first collection of documents by solving a constrained optimization for the first metric constrained by the first threshold value for the function of one or more second metrics, and
providing data representing the re-ranked first collection of documents to a device for display.

2. The method of claim 1, wherein the variable threshold function has been fitted to a data distribution that maps (i) values representing respective measures of quality for collections of documents after re-ranking, to (ii) values representing respective comparisons between the collections of documents before and after re-ranking.

3. The method of claim 2, wherein the re-ranking of the collections of documents comprises solving a global optimization for the first metric constrained by a fixed threshold value for the function of one or more second metrics.

4. The method of claim 2,
wherein the respective measures of quality of the collections of documents are respective expected measures of quality computed using respective first metric values for the collections of documents, and
wherein the respective comparisons between the collections of documents before and after re-ranking are respective percentage differences for the respective expected measures of quality for the collections of documents before and after re-ranking.

5. The method of claim 2, wherein the method further comprises generating the data distribution before receiving the request to re-rank the first collection of documents.

6. The method of claim 1, wherein determining the constraint on the function of one or more second metrics by computing the first threshold value using the variable threshold function that takes as input the second metric values for the documents in the first collection of documents comprises processing, through the variable threshold function, an expected value of the second metric values for the documents in the first collection of documents.

7. The method of claim 1, wherein determining the re-ranking for the first collection of documents comprises:
determining respective weight values for each of the second metrics that, when used in re-ranking the collection of documents, result in a re-ranking that optimizes the first metric constrained by the first threshold value for the one or more second metrics;
determining a respective ranking score for each document of the first collection of documents based on the respective weight values; and
re-ranking the documents of the first collection of documents according to the determined ranking scores.

8. The method of claim 7, wherein determining the respective weight values comprises determining the respective weight values using binary search.

9. The method of claim 8, wherein determining the respective weight values using binary search comprises:
determining respective first weight values that, when used in determining the respective ranking score for each document of the first collection of documents, causes the re-ranked first collection of documents to not meet the first threshold value;
determining respective second weight values that, when used in determining the respective ranking score for each document of the first collection of documents, causes the re-ranked first collection of documents to meet the first threshold value; and
determining the respective weight values by determining a respective average weight value between each respective first weight value and each respective second weight value.

10. The method of claim 1, wherein the first threshold value comprises a respective second metric threshold value for each of the one or more second metrics.

11. The method of claim 1, wherein the request is a first request, the constraint is a first constraint, and wherein the method further comprises:
receiving a second request to re-rank a second collection of documents according to the first metric and subject to a second constraint on the function of one or more second metrics; and
in response to the second request to re-rank the second collection of documents, re-ranking the second collection of documents, comprising:
determining the second constraint on the one or more second metrics by computing a second threshold value using the variable threshold function; and
determining the re-ranking for the second collection of documents by solving a constrained optimization for the first metric constrained by the second threshold value for the function of one or more second metrics.

12. The method of claim 11, wherein the second constraint is different than the first constraint.

13. The method of claim 1, wherein each of the documents of the first collection of documents represents a respective software application available on a software application marketplace.

14. The method of claim 13, wherein the first metric is a probability of software application usage by users within a predetermined period of time of software applications represented by the documents of the first collection of documents, and wherein the function of the one or more second metrics is a measure of quality of the respective software applications represented by the documents of the first collection of documents.

15. The method of claim 1, wherein the method further comprises obtaining the first collection of documents from a plurality of documents by processing, as input, the plurality of documents through a candidate generation machine learning model trained to output recommended documents from the plurality of documents based on metric values for the documents.

16. The method of claim 1, wherein the variable threshold function is a monotonically decreasing function.

17. The method of claim 1, wherein the variable threshold function is a linear function or the variable threshold function is an exponential function.

18. The method of claim 1, wherein the request to re-rank the first collection of documents is received from a computing device having a display, and wherein the method further comprises:
sending the data representing the re-ranked first collection of documents to the computing device for display in order of the re-ranking.

19. The method of claim 1, wherein the first collection of documents comprises 200 documents.

20. A system comprising one or more computers and one or more storage devices on which are stored instructions that are operable, when executed by the one or more computers, to cause the one or more computers to perform operations comprising:
receiving a request to re-rank a first collection of documents according to a first metric and subject to a constraint on a function of one or more second metrics;
obtaining, for each document in the first collection of documents, a respective first metric value corresponding to the first metric and respective one or more second metric values corresponding to the one or more second metrics;
in response to the request to re-rank the first collection of documents, re-ranking the first collection of documents, comprising:
determining the constraint on the function of one or more second metrics by computing a first threshold value using a variable threshold function that takes as input second metric values for the documents in the first collection of documents; and
determining the re-ranking for the first collection of documents by solving a constrained optimization for the first metric constrained by the first threshold value for the function of one or more second metrics, and
providing data representing the re-ranked first collection of documents to a device for display.

21. One or more non-transitory computer-readable storage media encoded with instructions that, when executed by one or more computers, cause the one or more computers to perform operations comprising:

receiving a request to re-rank a first collection of documents according to a first metric and subject to a constraint on a function of one or more second metrics;

obtaining, for each document in the first collection of documents, a respective first metric value corresponding to the first metric and respective one or more second metric values corresponding to the one or more second metrics;

in response to the request to re-rank the first collection of documents, re-ranking the first collection of documents, comprising:

determining the constraint on the function of one or more second metrics by computing a first threshold value using a variable threshold function that takes as input second metric values for the documents in the first collection of documents; and determining the re-ranking for the first collection of documents by solving a constrained optimization for the first metric constrained by the first threshold value for the function of one or more second metrics, and providing data representing the re-ranked first collection of documents to a device for display.

* * * * *